(12) United States Patent
Naritomi

(10) Patent No.: US 6,274,072 B1
(45) Date of Patent: Aug. 14, 2001

(54) METHOD OF MANUFACTURING PLASTIC MOLDINGS USING A WATER SOLUBLE CORE

(75) Inventor: Masanori Naritomi, Tokyo (JP)

(73) Assignee: Taisei Plas Co., Ltd., Tokyo (JP)

( * ) Notice: Subject to any disclaimer, the term of this patent is extended or adjusted under 35 U.S.C. 154(b) by 0 days.

(21) Appl. No.: 09/147,617

(22) PCT Filed: Jun. 3, 1998

(86) PCT No.: PCT/JP98/02460

§ 371 Date: Feb. 2, 1999

§ 102(e) Date: Feb. 2, 1999

(87) PCT Pub. No.: WO98/55285

PCT Pub. Date: Oct. 12, 1998

(30) Foreign Application Priority Data

Jun. 3, 1997 (JP) .................................................... 9-160439

(51) Int. Cl.⁷ ............................ B29C 39/26; B29C 45/10

(52) U.S. Cl. ............................ 264/250; 264/313; 264/317

(58) Field of Search ..................................... 264/250, 317, 264/313

(56) References Cited

U.S. PATENT DOCUMENTS

| | | | | |
|---|---|---|---|---|
| 3,610,314 | * | 10/1971 | Hochgraf | 164/27 |
| 4,027,903 | * | 6/1977 | Hannover | 264/221 |
| 5,262,100 | * | 11/1993 | Moore et al. | 264/317 |
| 5,520,871 | * | 5/1996 | Rosenberg et al. | 264/317 |
| 5,985,197 | * | 11/1999 | Nelson et al. | 264/317 |
| 6,045,745 | * | 4/2000 | Reno | 264/317 |

FOREIGN PATENT DOCUMENTS

| | | |
|---|---|---|
| 3-45116 | 4/1991 | (JP) . |
| 7-316379 | 12/1995 | (JP) . |
| 9-29780 | 2/1997 | (JP) . |

* cited by examiner

Primary Examiner—Allan R. Kuhns
(74) Attorney, Agent, or Firm—Arent Fox Kintner Plotkin & Kahn, PLLC

(57) ABSTRACT

The present invention relates to a process for producing a plastic molded article (1) having at least partly a hollow portion, and molding is conducted using a core (2) composed of a water-soluble molded article which has been formed to have the shape of the hollow portion. A plastic material is injected to cover part of the surface of the core (2), and subsequently injected to cover the remainder of the surface of the core (2), followed by finally removing the core (2) with water.

3 Claims, 6 Drawing Sheets

METHOD OF MANUFACTURING PLASTIC MOLDINGS USING A WATER SOLUBLE CORE

FIELD OF THE INVENTION

The present invention relates to a process for producing such a plastic molded article having at least partly a hollow portion as a tube or a container, and a core used therefor, and particularly to a process for producing a plastic molded article the hollow portion of which can be molded to have a freely selected shape, and a core used therefor.

BACKGROUND OF THE INVENTION

When a plastic branch tube 1 as shown in FIG. 7 is integrally molded by conventional injection molding, slide molds 4 which are provided to an elevation mold 3 so that they can be moved back and forth are used. That is, the hollow portion of the branch tube 1 is formed by getting the tips of the three slide molds 4 butted against each other, and the branch tube 1 shown in FIG. 7 is produced by withdrawing the slide molds 4 after finishing injection.

However, in the conventional process in which the slide molds are used, the slide molds must be withdrawn after finishing injection. Accordingly, a branch tube 1 which, for example, has a curved hollow portion as shown in FIG. 6 cannot be molded. Moreover, screw portions la cannot be integrally molded, and there is no other way but to form them by another step after molding.

DISCLOSURE OF THE INVENTION

The present invention has been achieved in view of the problems associated with the prior art as mentioned above. An object of the present invention is to provide a process for producing a plastic molded article the hollow portion of which can be molded to have a freely selected shape, and a core used therefor.

In order to attain the object, the process for producing a plastic molded article having at least partly a hollow portion of the present invention comprises conducting molding by using a core composed of a water-soluble molded article which has been formed to have the shape of the hollow portion.

In the process for producing a plastic molded article according to the present invention, a water-soluble molded article is used as a core during molding, and it is removed with water thereafter. That is, first, a water-soluble molded article is molded to have the shape of the hollow portion of a desired plastic molded article. The molded article is set in a mold, and a plastic material is molded by a procedure such as injection molding. When the molding is completed, the water-soluble core remaining in the hollow portion is removed by dissolving it with water.

The core composed of the water-soluble molded article of the present invention can be molded to have a freely selected shape, and can be easily removed after molding because it is soluble in water. The hollow portion having an arbitrary shape can, therefore, be molded. Moreover, screws and partial recesses and protrusions can be freely molded.

Furthermore, the water-soluble core of the present invention is not required to be heated as in the lost wax process used in the field of casting because it can be removed with water. Accordingly, there is no possibility at all that the molded article is thermally influenced at the time of removing the core. Moreover, since it is not necessary to use a core having a low melting point in contrast to the lost wax process, there is no possibility at all that the core is dissolved at the time of injecting a molten plastic material.

When molding is carried out using a water-soluble core in the process for producing a plastic molded article of the present invention, while the water-soluble core is held by a mold, a plastic material is injected into a cavity formed between the core and the mold, whereby a plastic molded article having a hollow portion is obtained. That is, a plastic molded article is produced by one molding step.

Furthermore, there may be the case where the water-soluble core cannot be held by the mold, depending on the shape or structure of the desired plastic molded article. In such a case, the following production process can be adopted.

That is, the process for producing a plastic molded article according to claim 3 comprises the step of injecting a plastic material, wherein part of the surface of the core is covered therewith, the step of injecting the plastic material, wherein the remainder or at least the remainder of the surface of the core is covered therewith, and the step of removing the core with water.

In the process for producing the plastic molded article, a plastic material is injected to cover part of the surface of the core, and as a result a molded article is formed on part of the surface of the core. The remainder of the surface of the core is held by a mold. Next, while the molded article having been molded is held by a mold, the plastic material is injected to cover the remainder of the surface of the core. The procedure may be conducted by one step or a plurality of steps. Since the core can thus be held by the mold, a desired plastic molded article can be produced.

Furthermore, the process for producing a molded article of the present invention as claimed in claim 4 comprises the step of molding an intermediate molded article which is to cover part of the surface of the core, the step of mounting the core on the intermediate molded article, the step of injecting the plastic material, wherein the remainder or at least the remainder of the surface of the core having been mounted on the intermediate molded article is covered therewith, and the step of removing the core with water In the process for producing a plastic molded article, an intermediate molded article which is to cover part of the surface of the core is molded first. The core is mounted thereon, and both are set in a mold, whereby the core is held by the mold. Finally, the plastic material is injected to cover the remainder of the surface of the core.

In the process for producing a plastic molded article of the present invention, there is no specific limitation on the material of the water-soluble molded article. One of the examples of the material comprises polyvinyl alcohol as a principal component and an added water-soluble bulk filler. Although there is no specific restriction on the water-soluble bulk filler, examples of the bulk filler include starch, sodium chloride and corn starch.

Furthermore, there is no specific limitation on the shape and structure of the molded article produced by the process for producing a plastic molded article according to the present invention, and the process can be applied to a plastic molded article so long as it has at least partly a hollow portion.

BEST MODE FOR CARRYING OUT THE INVENTION

The embodiments of the present invention will be explained below with reference to drawings.

First Embodiment

Figure 1A:
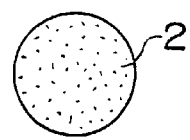
FIGS. 1A–FIG. 1D are cross-sectional views showing one embodiment of the process for producing a plastic molded article of the present invention.

FIGS. 1A–1D are cross-sectional views showing embodiment of the process for producing a plastic molded article of the present invention. FIG. 2 is a perspective view showing the embodiment. In the first embodiment, an explanation will be made on the case where the process is applied to the production of a branch tube 1 having a curved hollow portion as shown in FIG. 6.

Figure 6:
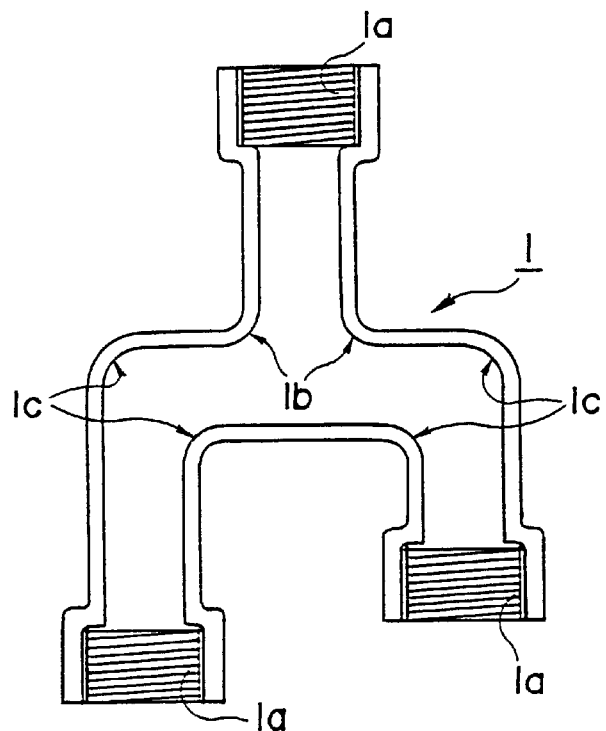
FIG. 6 is a cross-sectional view showing a branch tube which can be produced by the process for producing a plastic molded article of the present invention.
Figure 7:
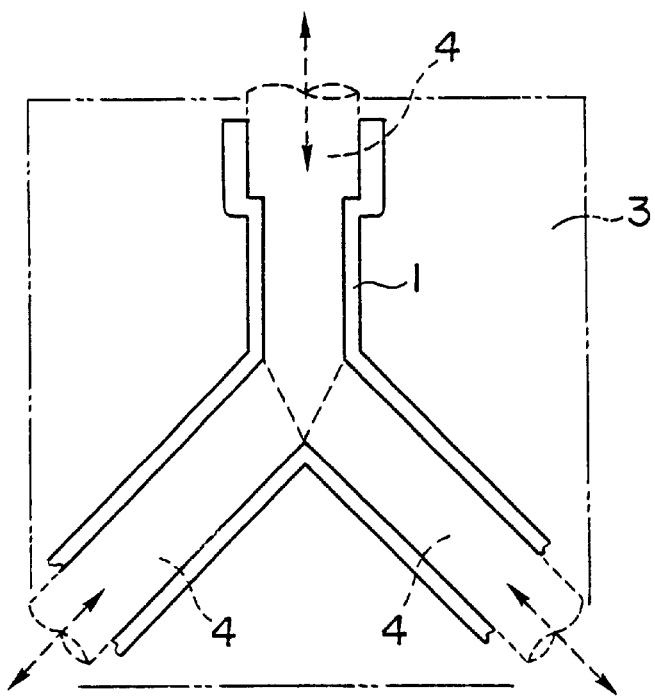
FIG. 7 is a cross-sectional view for illustrating a conventional process for producing a plastic molded article.

First, the branch tube 1 shown in FIG. 6 is formed with plastics such as polypropylene (hereinafter referred to as PP resin), has a screw portion 1a in the upper end opening, which is branched into two portions in the down stream. A screw portion 1a is formed in the lower end opening of each branched portion. Moreover, inner corners 1b of the branched portion and inner corners 1c of curved portions after being branched are each formed with a smooth curved surface. Use of such a plastic branch tube 1, for example, as a tube for transfusion can prevent destruction of leukocyte because the branch tube 1 has no sharp edge in the hollow portion.

As explained above, since the conventional production process uses slide molds, the slide molds cannot be withdrawn after molding when the desired molded article 1 has curved hollow portions as shown in FIG. 6, and the molded article 1 cannot be produced by injection molding.

In the production process in the present embodiment, a core 2 corresponding to the hollow portion of the branch tube 1 which is the desired plastic molded article is molded with a water-soluble material in advance. The core 2 is inserted into an injection mold 3, and injection molding is conducted. The core 2 remaining in the hollow portion is removed with water.

Material containing highly water-soluble polyvinyl alcohol as a principal component and an added water-soluble bulk filler such as starch, sodium chloride or corn starch is preferably employed for the core 2 used in the present embodiment. There is no specific limitation on the method for molding the core 2 having the shape of the hollow portion. Any of the procedures such as machining and sticking in addition to injection molding, cast molding and extrusion molding can be applied. FIG. 2 shows the water-soluble core 2 thus molded to have the hollow shape of the branch tube 1. Screw shapes corresponding to the screw portions 1a are also formed. FIG. 1A is a cross-sectional view of the core along the line I—I in FIG. 2.

Figure 1B:
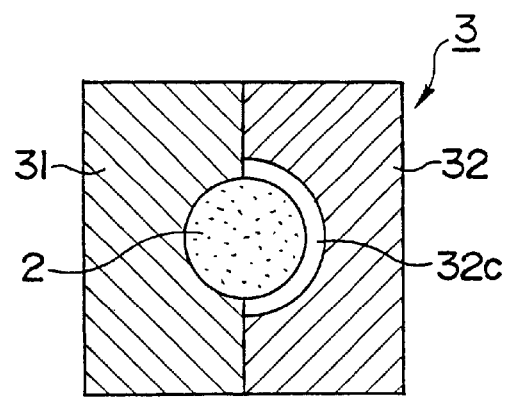
Figure 2:
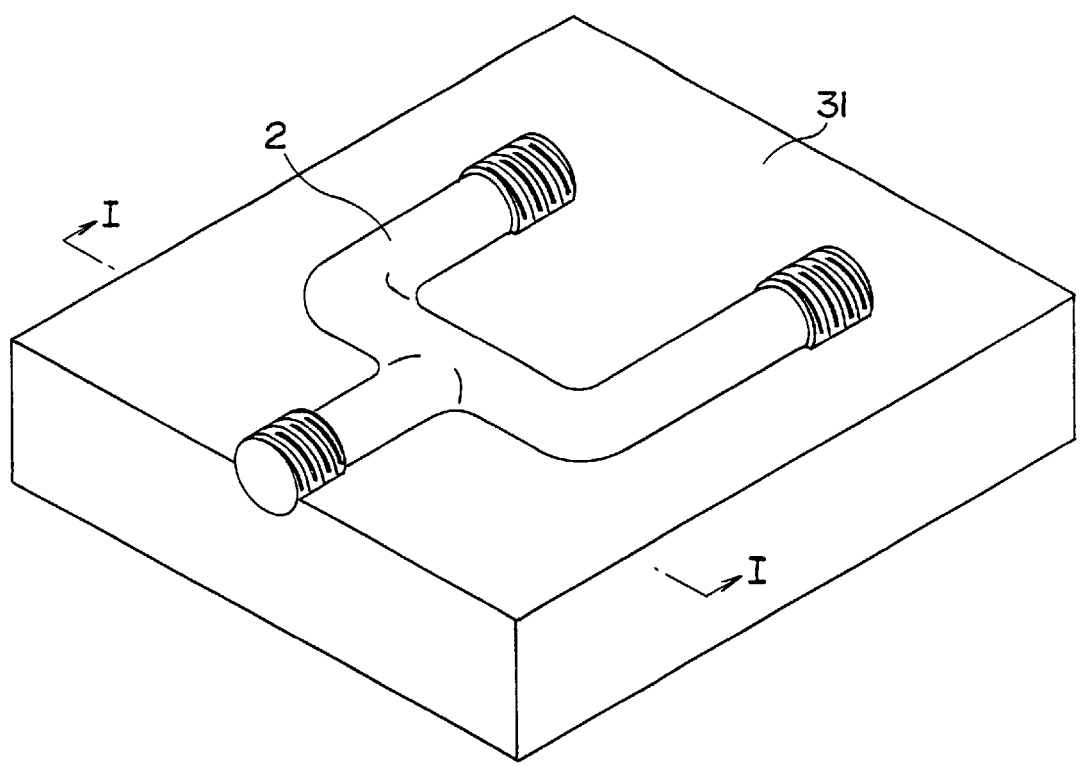
FIG. 2 is a perspective view showing the embodiment in FIG. 1.

Next, as shown in FIG. 1B and FIG. 2, the core 2 is held by a mold 31, and a cavity 32c is formed between another mold 32 and the core 2. The mold 31 is not a mold which is directly participated in molding the branch tube 1, but functions to hold the core 2. Accordingly, there is no specific limitation on the shape and structure thereof so long as it can hold the core 2.

Clamping is conducted as shown in FIG. 1B, and PP resin is injected into the cavity 32c formed between the surface of the core 2 and the inner surface of the mold 32, thereby forming a plastic 11 constituting the branch tube 1 on about half of the surface of the core 2.

Figure 1C:
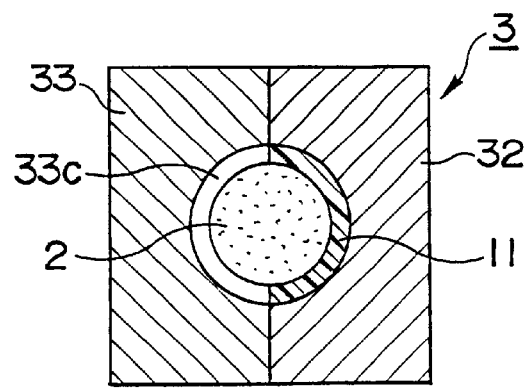
Figure 1D:
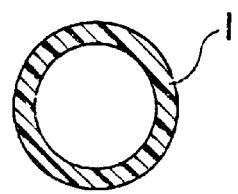

Next, the mold 31 in FIG. 1B is replaced with a mold 33 in FIG. 1C. As a result, a cavity 33c is formed between the surface of the core 2 not covered with the plastic 11 and the inner surface of the mold 33; PP resin is injected thereinto.

The branch tube 1 which is composed of PP resin and the hollow portion of which is packed with the core 2 is obtained by the steps mentioned above, and is released from the mold 3. Water is injected into one of the top end openings or each top end opening to dissolve the core 2, thereby producing the PP branch tube 1 the top end openings of which each have the screw portion 1a as shown in FIG. 6.

Moreover, examples of the procedure for dissolving the core 2 include a procedure wherein a jet is injected and a procedure wherein the branch tube 1 is immersed in water, and ultrasonic vibration is applied in addition to a procedure wherein the branch tube 1 is immersed in water. Furthermore, it is not necessary to dissolve the core 2 entirely, but it is satisfactory to dissolve the surface of the core 2 to some extent so as to remove the core from the hollow portion. Still furthermore, when the dissolved water-soluble resin is collected, it can be recycled to give the core 2.

Second Embodiment

The process for producing a plastic molded article of the present invention is not restricted to the first embodiment alone explained above, but various modified embodiments can be considered.

Figure 3A:
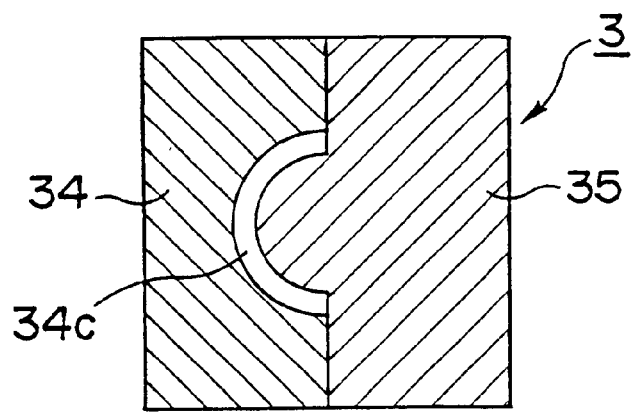
FIG. 3A–FIG. 3C are cross-sectional views showing another embodiment of the process for producing a plastic molded article of the present invention.
Figure 3B:
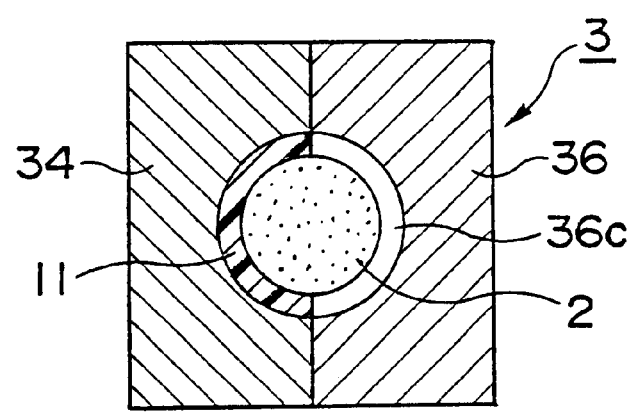
Figure 3C:
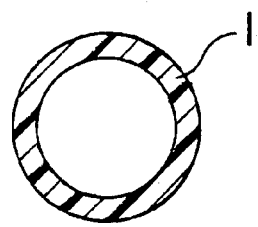

FIGS. 3A–3C are cross-sectional views showing another embodiment of the process for producing a plastic molded article of the present invention. First, a cavity 34c is formed with molds 34 and 35 without using a core 2 as shown in FIG. 3A, and PP resin is injected thereinto to form half of a branch tube 1.

Next, as shown in FIG. 3B, a water-soluble core 2 having been molded in advance is mounted on an intermediate molded article 11 of the branch tube 1, and the mold 34, and a mold 36 are clamped. The production method, shape, etc., of the core 2 are the same as in the first embodiment. Since a cavity 36c is thus formed between the surface of the core 2 not covered with the intermediate molded article 11 and the inner surface of the mold 36, PP resin is injected thereinto.

The branch tube 1 which is composed of PP resin and the hollow portion of which is packed with the core 2 is obtained by the steps as mentioned above. The branch tube 1 is then released from the mold 3 in the same manner as in the first embodiment as described above. Water is injected into one of the top end openings or each end opening to dissolve the core 2, thereby producing the PP branch tube 1 the top end openings of which each have a screw portion 1a as shown in FIG. 6.

Third Embodiment

In the first and second embodiments explained above, PP resin is injected by two steps to produce the branch tube 1 shown in FIG. 6. However, the injection can also be carried out by one step, depending on the shape of a desired plastic molded article.

Figure 4A:
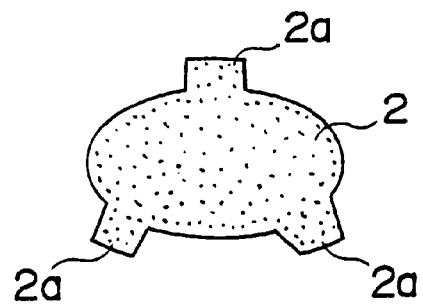
FIG. 4A–FIG. 4C are cross-sectional views showing still another embodiment of the process for producing a plastic molded article of the present invention.
Figure 4B:
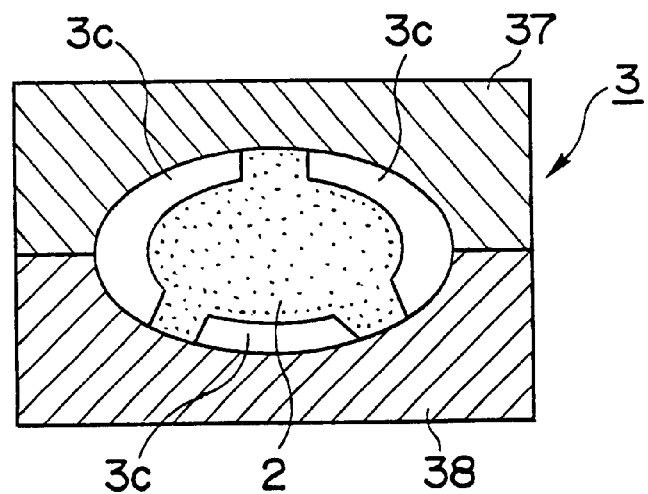
Figure 4C:
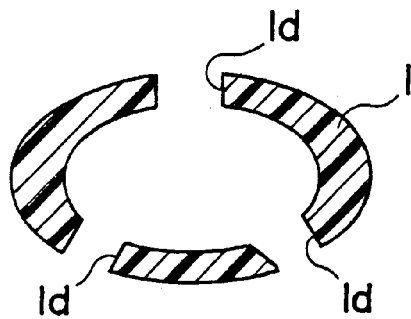

FIGS. 4A–4C are cross-sectional views showing still another embodiment of the process for producing a plastic molded article of the present invention. A desired plastic molded article 1 internally has a hollow oval shape, and a plurality of partial openings 1*d* as shown in FIG. 4C. When such a molded article 1 is to be produced, a core 2 having a shape corresponding to the hollow portion of the molded article 1 is molded in advance using a water-soluble resin similar to that used in the embodiments explained above, as shown in FIG. 4A. Protruded portions 2*a* corresponding to the openings 1*d* are also formed on the core 2.

Next, as shown in FIG. 4B, the core 2 is set in a mold 3 so that the protruded portions 2*a* of the core 2 are contacted with the inner surface of molds 37, 38. As a result, the core 2 itself is held by the molds 37, 38. A plastic material is injected into a cavity 3*c* formed between the surface of the core 2 and the inner surface of the molds 37, 38.

Since the plastic molded article 1 the hollow portion of which is packed with the core 2 is obtained by the steps mentioned above, the plastic molded article 1 is released from the molds 37, 38 in the same manner as in the first and second embodiments. The core 2 is then dissolved by injecting water into either one or each of the openings 1*d* to give the plastic oval hollow molded article 1 having the openings 1*d* as shown in FIG. 4C In addition, the embodiments explained above have been described not to restrict the present invention but to make the present invention easily understandable. Each element disclosed in the embodiments explained above, therefore, includes all design variations and equivalents belonging to the technical scope of the present invention.

Figure 5A:
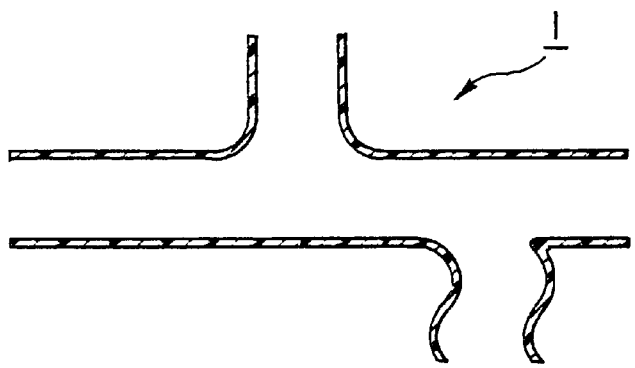
FIG. 5A–FIG. 5C are cross-sectional views showing examples of molded articles which can be produced by the process for producing a plastic molded article of the present invention.
Figure 5B:
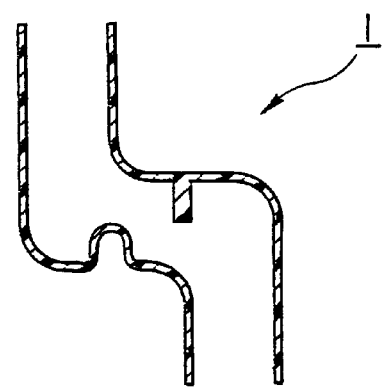
Figure 5C:
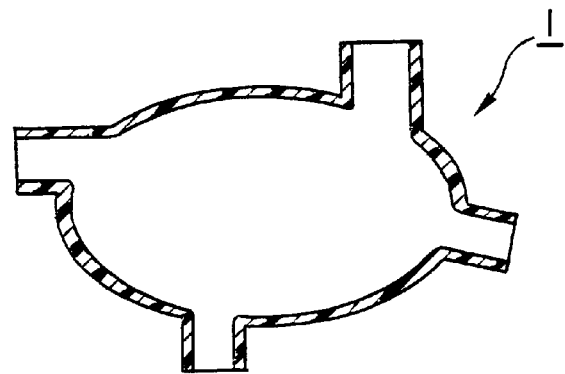

FIGS. 5A–5C are cross-sectional views each showing one embodiment of a molded article which can be produced by the process for producing a plastic molded article of the present invention. The following articles can thus be easily produced: a branch tube 1 having smooth inner surfaces and curved inner surfaces as shown in FIG. 5A a tube 1 having various protrusions and ribs in the hollow portion as shown in FIG. 5B; and an oval hollow molded article 1 having openings which may each have a screw portion as shown in FIG. 5C.

As explained above, according to the process for producing a plastic molded article and a core used therefor of the present invention, the hollow portion of the plastic molded article can be formed to have an arbitrary shape. Moreover, screws and partial recesses and protrusions can be freely molded.

What is claimed is:

1. A process for producing a plastic molded article having at least partly a hollow portion by using a core composed of a water-soluble molded article which has been formed to have a shape of the hollow portion, comprising:

a step of holding said core by a first mold and forming a first cavity between a second mold and said core, a step of injecting a plastic material into the first cavity, wherein part of a surface of said core is covered therewith, a step of replacing said first mold with a third mold and forming a second cavity between said third mold and said core, a step of injecting a plastic material into the second cavity, wherein a remainder of a surface of said core is covered therewith, and a step of removing said core with water.

2. A process for producing a plastic molded article having at least partly a hollow portion by using a core composed of a water-soluble molded article which has been formed to have a shape of the hollow portion, comprising a step of forming a first cavity between a first mold and second mold, a step of injecting a plastic material into the first cavity and molding an intermediate molded article which is to cover part of a surface of said core, a step of mounting said core on said intermediate molded article, a step of forming a second cavity between said core and a third mold, a step of injecting a plastic material into the second cavity, wherein a remainder of a surface of said core having been mounted on said intermediate molded article is covered therewith, and a step of removing said core with water.

3. A process for producing a plastic molded article as claimed in claim 1 or 2, wherein said core comprises polyvinyl alcohol as a principal component and as added water-soluble bulk filler.

* * * * *